United States Patent Office 3,409,088
Patented Nov. 5, 1968

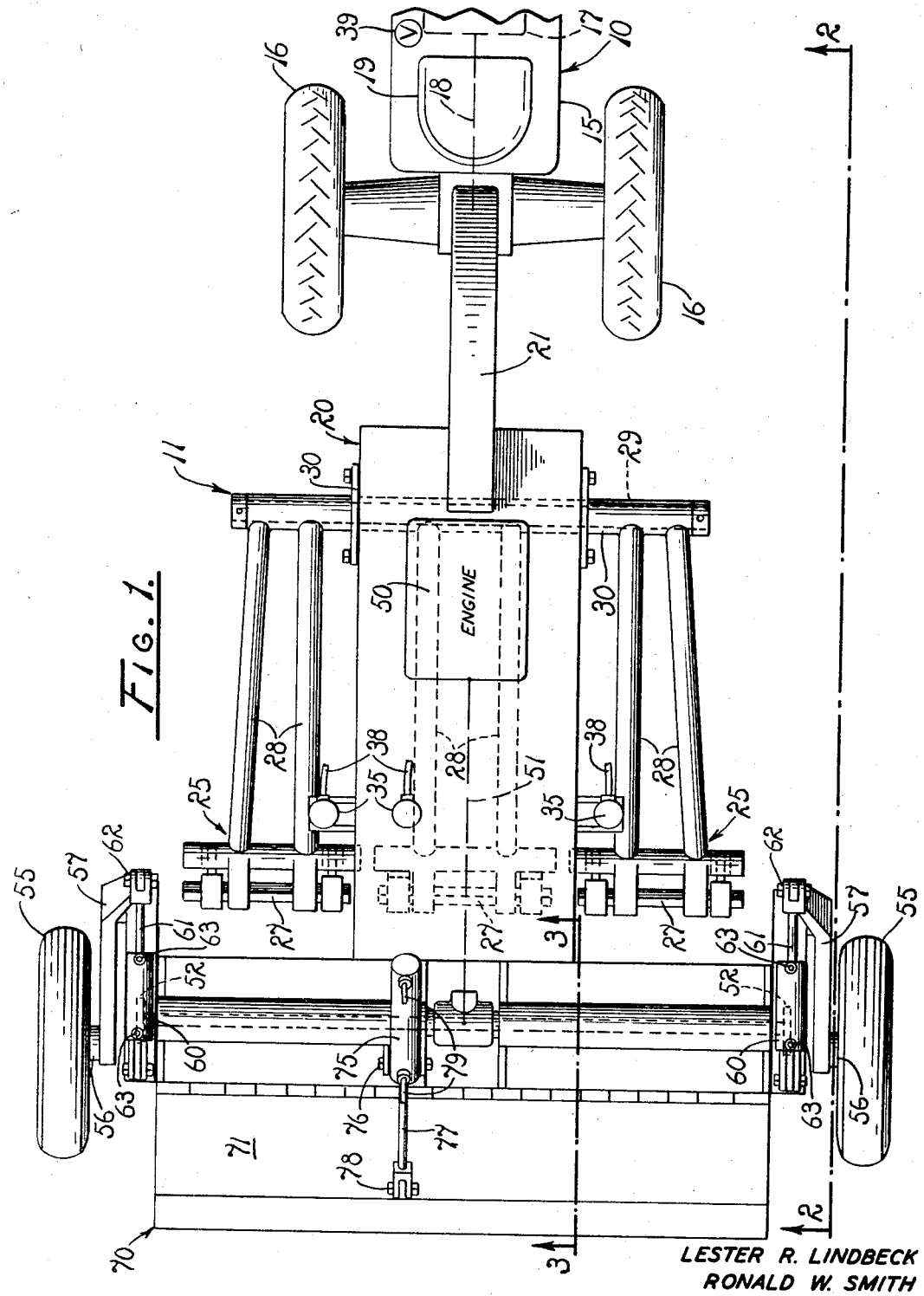

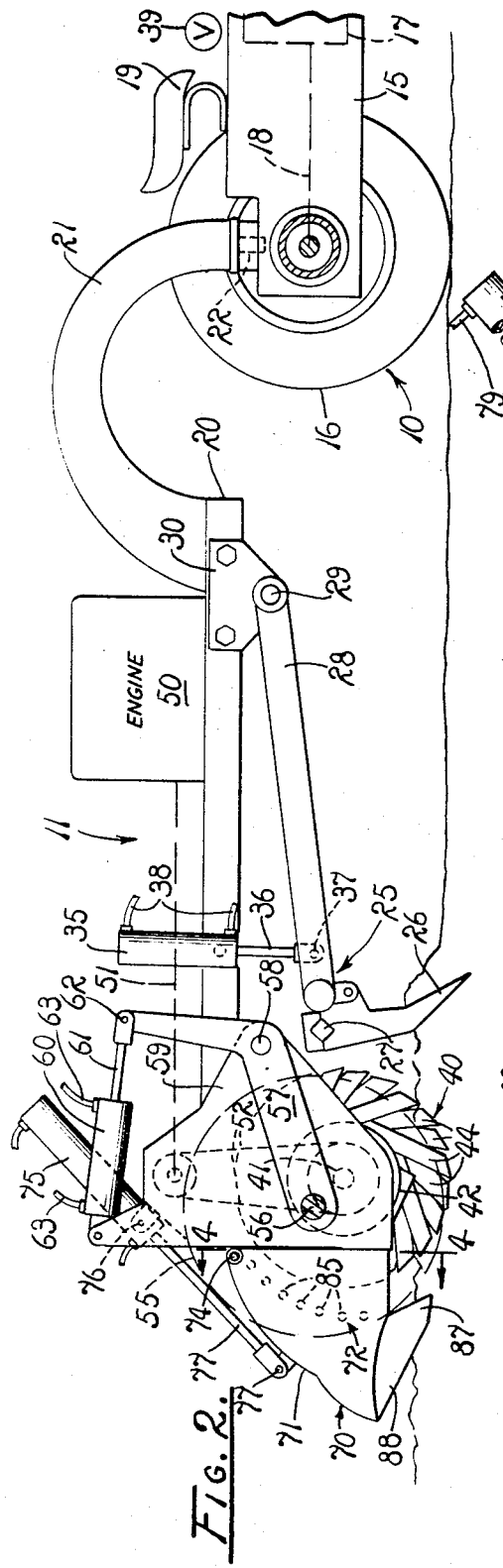

3,409,088
APPARATUS FOR SCARIFYING AND PULVERIZING COMPACTED SOIL AND THE LIKE
Lester R. Lindbeck, 12785 Ave. 18½, and Ronald W. Smith, 511 Alameda St., both of Chowchilla, Calif. 93610
Filed Mar. 1, 1965, Ser. No. 436,055
4 Claims. (Cl. 172—66)

ABSTRACT OF THE DISCLOSURE

An apparatus for scarifying and pulverizing frangible materials having a power driven cultivating rotor provided with a plurality of spaced radially extended teeth inclined forwardly in relation to the direction of rotor rotation and a shroud having an arcuate reticulate particle-size control grid mounted in the shroud with the grid formed on a radius greater than said rotor to form a crescent-shaped hammer mill area between the grid and the rotor to force material fragments too large to pass through the grid into the spaces between the teeth for transport over the rotor and their gravitational and centrifugal discharge ahead of the rotor for further engagement by the teeth until sufficiently reduced in size to pass through the grid.

---

Presently available implements for performing ripping or scarifying functions as well as fragmentation of large aggregate masses in soils include rippers, disc harrows, deep tillage moldboard plows, and the like. On occasion, implements such as sheep's foot rollers have been employed in an attempt to reduce the size of large aggregate masses in roadways following the employment of a ripper. Heretofore, no single implement has been available which can effectively break or shatter a cohesive mass, such as a hardpan soil or asphaltic roadway, and concurrently reduces the size of the broken fragments or chunks of such aggregate masses.

Small cultivators having a plurality of teeth extended from rotors have been used in preparing small plots of ground, such as intended for said areas in residential yards or private flows and vegetable gardens. Such cultivators are ineffective in tilling hard soils, particularly at the depths required in breaking plow pan formed in agricultural areas, subsurface hardpan, and soils deeply compacted by heavy traffic or other causes. It is not uncommon to encounter compacted soils or hardpan six to eighteen inches below the surface of the soil.

Commercially available soil scarifying implements, known as rippers, are quite effective to pierce and shatter such hardpan formations. Once shattered, the discrete chunks are of such a size as to preclude their being cultivated by presently available tillage tools. The rippers are not effective to break up the large aggregate masses, and the size of the fragments precludes the effective use of disc harrows and the like.

Accordingly, it is an object of the present invention to provide an improved apparatus for effective cultivation of hard soils of agricultural, roadbed or other type.

Another object is to provide cultivating apparatus which is capable of preparing seedbeds from areas presently supporting dense vegetation, such as heavy bermuda grass and the like.

Another object to provide an apparatus for scarifying and pulverizing comparted soils, particularly those having large aggregate masses not readily fractured by conventional agricultural tillage tools.

Another object is to provide such a scarifying and pulverizing apparatus which is capable of use in reconstruction of roadways, such as these utilizing coherent asphaltic mixes.

Another object is to provide such an apparatus which readily accommodates various types of soils and operating conditions.

Another object is to provide an agricultural cultivator to help reclaim acreages not now available for productive use in agriculture.

A further object is to provide a scarifying and pulverizing apparatus having separate tool elements to perform the respective functions of scarifying and pulverizing, and providing independent adjustment of each tool element to conform to varying soil and vegetation conditions encountered.

These, together with other objects, will become more fully apparent upon reference to the following description and accompanying drawings.

In the drawings:

FIG. 1 is a top plan view of a scarifying and pulverizing apparatus embodying the principles of the present invention.

FIG. 2 is a view in vertical, longitudinal section of the apparatus of FIG. 1, taken on line 2—2 thereof.

FIG. 3 is an enlarged fragmentary view in longitudinal section taken on line 3—3 of FIG. 1.

FIG. 4 is a fragmentary view in elevation showing the grid and shroud structure of the apparatus and taken in a plane represented by line 4—4 of FIG. 2.

FIG. 5 is a view in front elevation of the tillage tool employed as a cultivating rotor in the apparatus of the present invention.

Referring in greater particularity to FIGS. 1 and 2 of the drawings, the apparatus includes a tractor or prime mover portion 10 and an implement portion 11, which are interconnected to form an integral articulated scarifying and pulverizing apparatus. The tractor portion 10 is shown fragmentarily, and in a commercial form of the invention, is provided with a conventional chassis supported on four ground engaging wheels. It will be apparent that two-wheeled tractors may also be utilized.

As illustrated in the drawings, the tractor 10 is provided with a ground traversing frame 15 supported by laterally opposed wheels 16. The wheels are mounted for driven rotation and are connected to an engine, schematically shown at 17, through a suitable power train shown schematically at 18. Consequently, the tractor is constructed for powered earth traversing movement along a path of travel determinable by an operator, for whom a station is provided at 19. The tractor normally includes a pair of forward wheels similar to 16, except that they need not be power driven and are mounted on the frame for selective dirigible movement of the tractor 10, and for maintenance of a selected path of travel.

The implement portion 11 includes a heavy-duty rigid frame 20 having an integral forwardly extended gooseneck 21. The gooseneck terminates at its lower end with a suitable adapter for connection to a coupling element 22, as illustrated in FIG. 2. This permits relative horizontal pivotal movement between the prime mover portion and the implement portion of the apparatus.

The implement portion 11 is provided with a scarifying tool 25, also termed a ripper, as a first tillage tool. The scarifier has a plurality of elongated teeth 26 spaced at uniform intervals along a transversely extended tool bar 27. A plurality of draft members 28 are pivotally connected to the frame 20 by an elongated pivot pin 29 carried in brackets 30 rigidly secured to the frame. The draft frame members are secured to the tool bar at their opposite ends, thus permitting elevational movement of the teeth 26.

To accomplish selective elevation of the scarifying tool 25, a ram 35 is pivotally mounted on the frame 20. The ram is adapted for selective expansion and contraction and includes an extensible piston rod 36 pivotally connected to the scarifier at 37. Suitable fluid conducting hoses 38 interconnect the ram 35 and a control valve 39 provided on the tractor 10. The valve 39 may be a bank of control valves, and such a construction is schematically illustrated.

A cultivating rotor 40 is provided as a second tillage tool arranged in tandem with the scarifying tool 25. The rotor is mounted on an elongated central shaft 41 which is rotatably mounted in the frame 20 and provides an axis of rotation transversely disposed to the path of travel of the machine. A cylindrical shell 42 is secured to the shaft by suitable web members to form a generally cylindrical structure. A plurality of individual teeth 43 are rigidly secured, as by welding, to the cylindrical shell 42 in a spiral pattern, as shown in FIG. 5. It is to be noted that the teeth are arranged in a double spiral with each tooth of a first spiral mounted on the shell in diametrically opposed relation to a corresponding tooth in the second spiral. As can be best seen in FIG. 3, each of the teeth is inclined tangentially with respect to the cylindrical shell 42, and inclined forwardly with respect to the direction of rotation, which is clockwise, as viewed. The double spiral arrangement of the teeth provides a greater number of impacts with the earth during rotation of the rotor than a single spiral, while providing intervals of axial and circumferential spacing to allow large masses or chunks of aggregate or compacted soil to be returned to a hammermill area soon to be described, in the event of temporary jamming. Each of the teeth 43 is fabricated of steel and provided with a hard faced tip 44 for maximum performance periods and minimization of wear.

An engine 50 is mounted on the implement portion and through a power train 51 including a chain drive 52 imparts powered rotation to the rotor 40. The power train and chain drive are shown schematically, and it is to be understood that normal bearings and enclosing housings, not shown, are provided for support of elements in the power train and proper lubrication thereof. That portion of the rotor periphery in contact with the ground is rotated preferably in a direction opposite to that of machine movement and at a speed ratio of approximately twelve to one.

A pair of laterally opposed depth control or gauge wheels 55 are supported on individual axles 56. A pair of laterally opposed bell cranks 57 each support one of the axles 56 and are independently pivotally mounted on the frame 20 by respective pivot pins 58. The pivot pins 58 are carried in respective brackets 59 rigidly extended from the frame 20. An hydraulic ram 60 is pivotally connected at one end to an upstanding lug secured to the frame, and is provided with a piston rod 61 extending from the opposite end. The rod is pivotally connected at 62 to the bell crank 57, and upon appropriate extension and contraction of the ram 60, effects consequent changes in the elevation of the periphery of the rotor in contact with the ground. For such extension and contraction, a pair of hoses 63 are connected to the ram 60 and lead to one of the valves in the valve bank 39 for selective control of the ram 60. The bank of valves 39 is also connected to a source of pressure fluid, such as a conventional hydraulic pump normally found on commercially available tractors.

The rotor 40 is partially enclosed by a shroud generally indicated at 70. The shroud is disposed adjacent to that portion of the peripheral of the rotor immediately following contact with soil or other material to be pulverized. As can be best seen in FIG. 3, the shroud includes an arcuate, partially, circumferentially extended wall 71. The wall is fabricated of an impervious material, such as steel, and is formed on a radius greater than that of the cylinder generated by the tooth tips 44 upon rotation of the rotor 40. The shroud also includes an arcuate fractionally circumferentially extended reticulated grid, which is also formed on a radius greater than the rotor 40. The grid is rigidly carried in the shroud and fabricated of heavy steel bars to withstand the forces of impinging masses of aggregate and the like during operation of the machine. It will be noted that a crescent shaped hammer mill area 73 is defined by the shroud and that portion of the rotor periphery immediately adjacent thereto. The hammer mill area can be selectively varied by reason of the pivotal connection by pin 74 carried by the frame 20 and appropriate extension and contraction of an hydraulic ram 75 pivotally connected to the frame at 76. The ram includes a piston rod 77 connected to the shroud by a pin 78 for actuation thereof. A pair of hoses, fragmentarily illustrated at 79, are also connected to one of the valves in the bank 39 for selective control of the ram 75 and consequent varying of the hammer mill area 73. If desired, the shroud can be raised to the position shown in dashed lines in FIG. 3 wherein the shroud is out of the zone of operation and the hammer mill action of the machine is terminated.

The grid is formed of a plurality of circumferentially spaced transversely extended bars 85 rigidly secured, as by welding, to a plurality of axially spaced arcuate reinforcing members 86. The reinforcing members are extended below the lower limit of the grid 72 to provide a series of axially spaced teeth 87. These teeth are rigidly joined to the wall 71 by extension rearwardly in web portions 88.

Operation

The operation of the described embodiment of the subject invention is believed to be readily apparent and is briefly summarized at this point. The apparatus is designed for both independent utilization of the two tillage tools, as well as for concurrent usage. The effectiveness of the machine is more fully demonstrated in the reclamation of hardpan agricultural soils, as well as reconstruction of roadways employing a frangible paving material, such as an asphaltic compound and gravel. In scarifying and pulverizing such constituent materials, the tractor engine is operated to give a satisfactory rate of ground traversal speed consistent with the tractive effort available to relation to that required by the degree of tooth penetration. Normally, the coefficient of friction and avilable tractive effort is of a minor consequence, since the machine is not intended for use in soft or wet soils, since these are not sufficiently friable and cannot be readily pulverized by the rotor in conjunction with the grid.

In actual operation of the machine, a satisfactory ground traversing speed has been found to be approximately three miles per hour when cultivating hardpan soil having a depth of approximately ten inches. Concurrently, the engine mounted on the implement portion is also operated, and the drive train completed to the rotor 40. The drive train includes selectively variable components to change the ratio of rotational speed of the rotor to that of the engine. A satisfactory rotor speed during cultivation of the aforementioned hardpan soil has been found to be 400 r.p.m. Consequently, the approximate ratio between the peripheral speed of the rotor teeth and the ground traversing speed of the integral machine is twelve to one. With such a ratio, and by employing a rotor having a double spiral, complete cultivation of the soil is assured.

Appropriate operation of the depth control ram 60 raises and lowers the gauge wheels 55 to effect consequent elevation of the periphery of the rotor in contact with the ground. Consequently, the operator can conveniently select the desired level of operation of the rotor periphery.

During ripping of hardpan soil and the like, large masses, or chunks, of aggregate soil pass between the transversely spaced ripper teeth and are contacted by the rotor teeth 43. Upon such contact, the chunks of soil are moved rearwardly and accelerated to be discharged from the rotor teeth to impinge against the grid 72. The reticulate dimensions of the grid determine the fragment size to be discharged through the grid following fracturing of the large chunks incident to such impingement. In the event that a large mass is not broken upon such impingement, it tends to fall between the rotor and the grid under the influence of gravitational force. Appropriate extension of the arm 65 can narrow or enlarge the hammer mill area to accommodate a particular type of soil condition, so that continued rotation of the rotor will throw additional material into the hammer mill area and carry such a nonfractured mass back into the hammer mill area for successive repeated contact by the tooth tips 44 and impingement against the grid. This action continues until the mass is reduced to fragments of a size permitting passage through the grid 72.

In the event that a large mass attempts to pass through the crescent area at the uppermost throat indicated at 90, wherein the hammer mill area is at its minimum dimension, the spacing of the teeth permits such an entrapped chunk to pass and to be carried forwardly with the rotor and discharged by centrifugal force. Consequently, it is disposed forwardly of the rotor where it is engaged upon subsequent ground travel by the machine.

The same ripping and hammer mill action is utilized in scarifying and pulverizing roadbeds and other similar materials. It is also employed when recovering agricultural soil supporting dense vegetation or turf, such as bermuda grass and the like. A difficulty encountered in such reclamation is the breaking up of the entrained rhizomes of the grass plants. By the same hammer mill action, the plants are repeatedly thrown against the grid until reduced to a size permitting passage through the reticulate openings. As in the case of frangible soils, the effective area of the hammer mill zone 73 is selectively varied to accommodate the operating condition by appropriate extension and retraction of the ram 75.

Accordingly, it will be observed that an integrated scarifying and pulverizing apparatus has been provided by the invention, which permits a single operator to achieve maximum utilization of power in reclaiming agricultural soils. The same effective scarifying and hammer will action is available when the machine is used in reconstruction of hard packed roadbeds and the like. By concurrent ripping and pulverizing, the single prime moving portion of the machine is employed for both functions and precludes any change in operating conditions during operation of the second tillage tool in the form of the cultivating rotor.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described our invention, what we claim as new and desire to secure by Letters Patent:

1. An improved apparatus for sacrificing and pulverizing frangible materials comprising a mobile frame mounted for earth traversing movement; a source of power carried by the frame including power transmission means; a generally cylindrical cultivating rotor mounted in the frame for rotation about a longitudinal axis and provided with a plurality of spaced generally radially extended peripheral teeth secured to the rotor in a spiral pattern and inclined forwardly in relation to the direction of rotor rotation to provide material retaining interstices circumferentially between the teeth to minimize the dropping of material fragments behind the rotor; means connecting said power transmission means in driving relation to said rotor; and a shroud pivotally carried by the frame for movement about an axis substantially parallel to said rotor axis and including an impervious shielding wall and a reticulate particle-size control grid of arcuate configuration mounted in the shroud and partially circumferentially extended about said rotor, said grid being formed on a radius greater than said rotor radius so that a crescent shaped hammer mill area is defined between the grid and that portion of the rotor periphery adjacent thereto to force material too large to pass through the grid into said interstices between the teeth for transport and gravitational and centrifugal discharge ahead of the rotor in position to be again engaged by the teeth and further fragmentized until sufficiently reduced in size to pass through the grid.

2. The apparatus of claim wherein the direction of rotor rotation relative to the direction of apparatus movement provides that portion of the rotor periphery in contact with the ground with a direction of movement opposite to that of apparatus movement, and said power transmission means rotating the rotor at a substantially greater velocity than the earth traversing movement of the apparatus.

3. The apparatus of claim 1 in which said grid comprises a plurality of circumferentially spaced substantially horizontally disposed bars, and a plurality of axially spaced reinforcing members disposed in interconnecting bridging relation between said bars and the wall for maintaining them in predetermined spaced relation with the wall deflecting material passing through the grid downwardly behind the rotor.

4. The apparatus of claim 3 wherein said reinforcing members are substantially flat plates disposed in planes aligned with the direction of earth traversing movement of the apparatus and having lower tooth portions extended below said grid and said wall in earth engaging trailing relation to the rotor.

References Cited
UNITED STATES PATENTS

| | | | |
|---|---|---|---|
| 1,552,750 | 9/1925 | Lain | 172—112 X |
| 1,600,663 | 9/1926 | Barrowman | 172—112 X |
| 2,312,164 | 2/1943 | Holzbock | 172—112 |
| 2,368,331 | 1/1945 | Seaman | 94—40 |
| 2,787,943 | 4/1957 | Browning | 172—72 X |
| 3,224,347 | 12/1965 | Seaman | 94—40 |

FOREIGN PATENTS

| | | |
|---|---|---|
| 361,685 | 6/1962 | Switzerland. |

ABRAHAM G. STONE, *Primary Examiner.*

J. R. OAKS, *Assistant Examiner.*